US008696220B2

(12) United States Patent
Wu

(10) Patent No.: US 8,696,220 B2
(45) Date of Patent: Apr. 15, 2014

(54) OPTICAL CONNECTOR WITH IMPROVED DUSTPROOF MECHANISM

(75) Inventor: Jerry Wu, Irvine, CA (US)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 165 days.

(21) Appl. No.: 13/349,581

(22) Filed: Jan. 13, 2012

(65) Prior Publication Data

US 2012/0183263 A1 Jul. 19, 2012

(30) Foreign Application Priority Data

Jan. 18, 2011 (CN) .......................... 2011 1 0020621

(51) Int. Cl.

*G02B 6/00* (2006.01)
*G02B 6/36* (2006.01)
*G02B 6/42* (2006.01)

(52) U.S. Cl.

CPC ................ *G02B 6/00* (2013.01); *G02B 6/4249* (2013.01); *G02B 6/4292* (2013.01); *G02B 6/4246* (2013.01)
USPC ............................................. 385/93; 385/147

(58) Field of Classification Search

CPC ......................................................... G02B 6/00
USPC ...................................................... 385/88–93
See application file for complete search history.

(56) References Cited

U.S. PATENT DOCUMENTS

| | | | | |
|---|---|---|---|---|
| 5,379,362 | A * | 1/1995 | Kawamura | 385/92 |
| 7,676,133 | B2 * | 3/2010 | Lampert et al. | 385/134 |
| 2003/0002816 | A1 * | 1/2003 | De Marchi | 385/78 |
| 2008/0031631 | A1 * | 2/2008 | Ko | 398/139 |
| 2010/0206102 | A1 * | 8/2010 | Aso et al. | 74/89.4 |
| 2010/0254667 | A1 * | 10/2010 | He et al. | 385/94 |
| 2011/0188818 | A1 * | 8/2011 | Sun et al. | 385/94 |

FOREIGN PATENT DOCUMENTS

| | | |
|---|---|---|
| CN | 2922177 | 7/2007 |
| CN | 101640325 | 2/2010 |
| JP | 2001013366 | 1/2001 |

* cited by examiner

*Primary Examiner* — Akm Enayet Ullah
(74) *Attorney, Agent, or Firm* — Wei Te Chung; Ming Chieh Chang

(57) ABSTRACT

An optical connector comprises an insulative housing defining an upper mating port, an optical device received in the housing and having at least one lens exposed to the upper mating port, and a dustproof mechanism movably retained in the housing along a mating direction of the optical connector. The dustproof mechanism includes a dustproof cover disposed in the mating port in an initial position and covering the lens, and a planar base disposed above the mating port and having a pushing projection protruding to an exterior of the optical connector. When the optical connector mates with a corresponding connector, the pushing projection is pushed to bring the dustproof cover leave from the upper mating port for allowing the lens to be exposed to exterior for mating with the corresponding connector.

20 Claims, 10 Drawing Sheets

91
92
8
100
812
712
43
1
7
42

81
812
811
82
73
731
733
4
43
42
74
711
712
71
1
102
1021
1023
106
5
2
10
12
72
14
6
31
311
315
312
32
91
92
100

100
82
81
72
1
71
73
2
6
32
91
92
31
5
74
4

OPTICAL CONNECTOR WITH IMPROVED DUSTPROOF MECHANISM

FIELD OF THE INVENTION

The present invention generally relates to an optical connector and more particularly to an optical connector with an improved dustproof mechanism.

DESCRIPTION OF PRIOR ART

With rapid developments in the electronic industry, various electronic devices have become widely used. However, conventional electronic devices are exposed to the outside. Dust or other contamination can enter into the electronic devices, which would pollute electronic devices. Chinese Utility Patent No. 2922177 issued on Jul. 11, 2007 discloses an electronic device comprising an insulative housing with a plurality of terminals assembled therein, and a dustproof cover assembled in the insulative housing. The insulative housing defines a front mating port for receiving a memory card, and a pair of curved guiding rails disposed at two lateral sides thereof. The dustproof cover has two side ends movably received in the guiding rails respectively, a middle portion covering the mating port for dustproof protection. The dustproof cover needs to be pushed to move and allow the mating port to be exposed to an exterior by an operator before the memory card is inserted into the mating port. However, the dustproof cover need to be pushed to move and return to cover the mating port after the memory card is withdrawn from the mating port. As described above, the dustproof is inconveniently to operate for user.

Hence, an improved optical connector is highly desired to overcome the aforementioned problems.

SUMMARY OF THE INVENTION

According to one aspect of the present invention, an optical connector adapted for mating with a corresponding connector, comprising: an insulative housing defining an upper mating port; an optical device received in the housing and having at least one lens exposed to the upper mating port; and a dustproof mechanism movably retained in the housing along a mating direction of the optical connector, the dustproof mechanism including a dustproof cover disposed in the mating port in an initial position and covering the lens along the mating direction, and a pushing projection protruding to an exterior of the optical connector; wherein when optical connector mates with the corresponding connector, the pushing projection is pushed backwardly to urge the dustproof cover to leave from the upper mating port and allow the lens to optically couple to the corresponding connector.

According to another aspect of the present invention, a cable connector assembly, comprises: an insulative housing having an upper mating port and a lower mating port respectively located in an upper side and a lower side of a front segment thereof; an optical module accommodated in the upper mating port, the optical module having a seat and at least one lens mounted into the seat; a plurality of terminals assembled in the housing and extending into the lower mating port; a dustproof mechanism attached to the housing and being movable between an initial position and a final position; and a cable connected to the lens and the terminals; wherein the dustproof mechanism covers the lens at the initial position for dustproof shield, at least one of the lens and the terminals are exposed to an exterior of the cable connector assembly for engaging with a corresponding connector while the dustproof mechanism is at the final position.

Other objects, advantages and novel features of the invention will become more apparent from the following detailed description when taken in conjunction with the accompanying drawings.

DETAILED DESCRIPTION OF PREFERRED EMBODIMENTS

Reference will now be made in detail to the preferred embodiment of the present invention.

Figure 1:
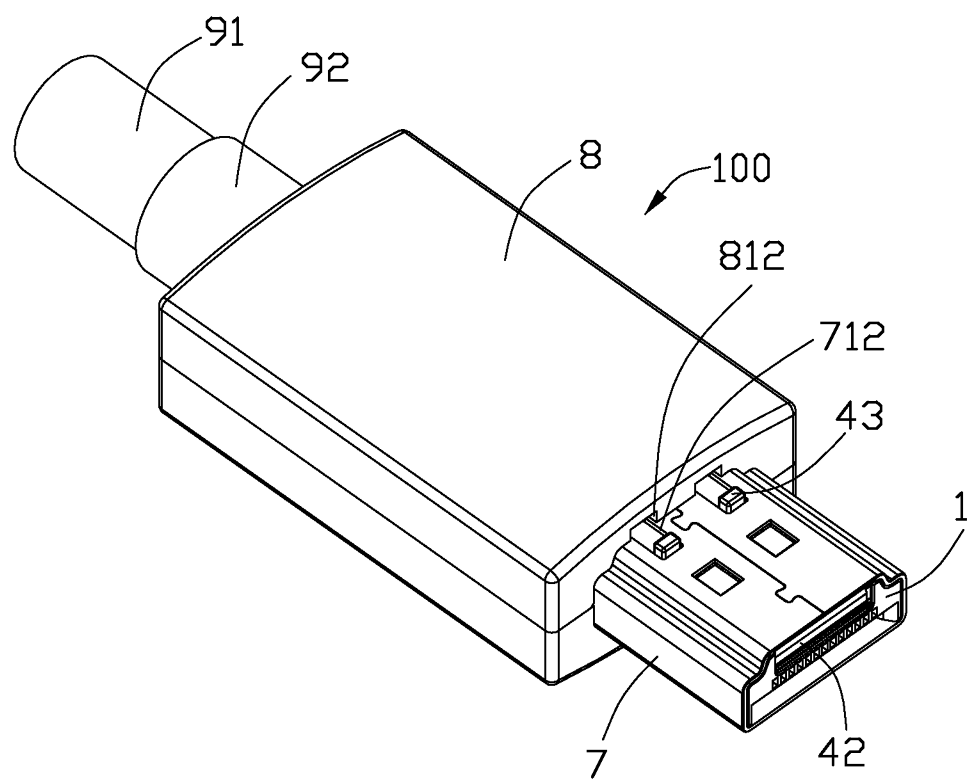
FIG. 1 is an assembled, perspective view of an optical connector in accordance with the present invention.
Figure 2:
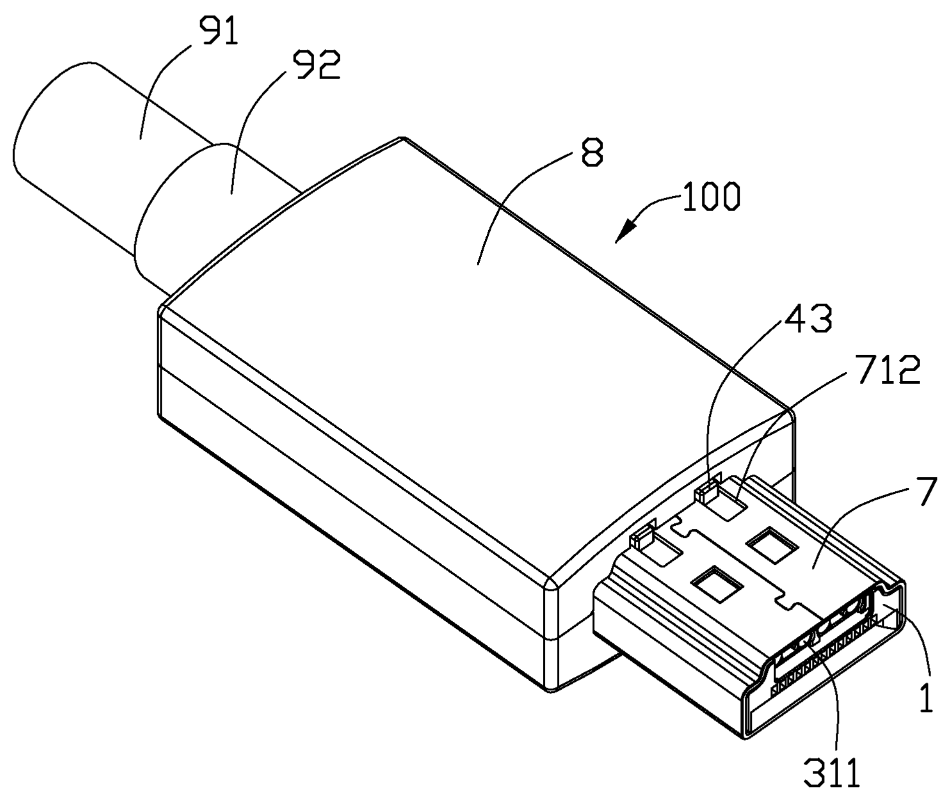
FIG. 2 is similar to FIG. 1, but a pair of pushing projections of a dustproof mechanism is located at another position.
Figure 5:
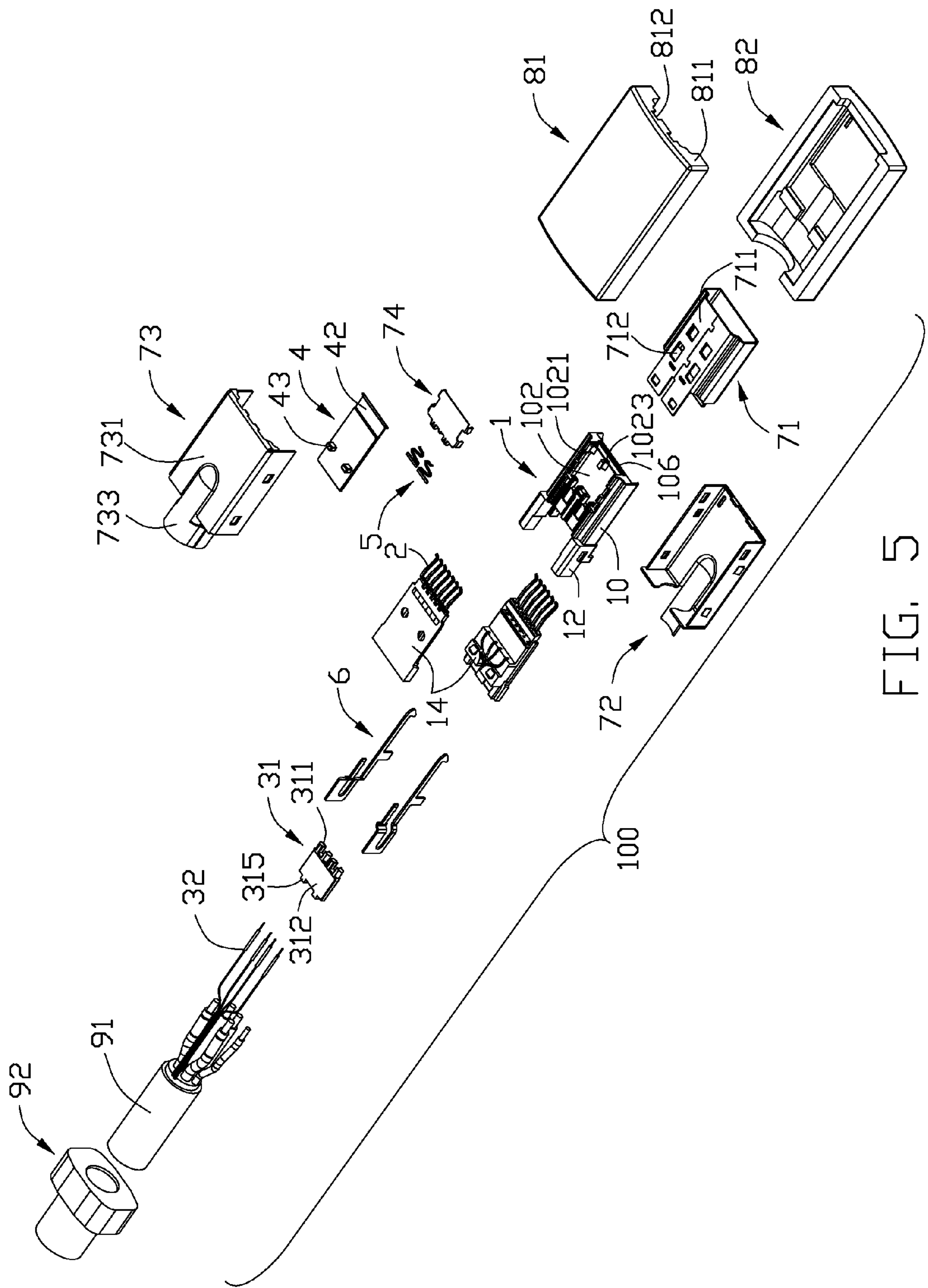
FIG. 5 is an exploded view of the optical connector shown in FIG. 1.

Referring to FIGS. 1-2 in conjunction with FIG. 5, an optical connector 100 in accordance with the present invention is a cable connector assembly and comprises an insulative housing 1, a plurality of terminals 3 assembled in the housing 1, an optical device 3 movably retained in the housing 1 for optical transmitting, a dustproof mechanism 4 attached to the housing 1, a pair of springs 5 sandwiched between the housing 1 and the dustproof mechanism 4 in a mating direction (front-to-back direction) thereof, a pair of metallic latching members 6 retained in the housing 1 for locking with a corresponding connector (not shown), a metallic shell 7, an external cover 8, a cable 91, and a strain relief 92.

Figure 8:
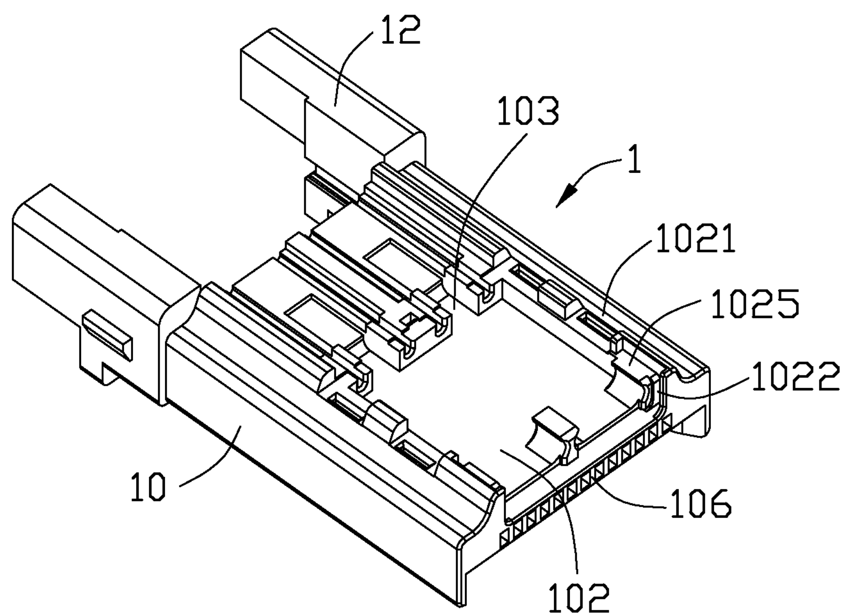
FIG. 8 is a perspective view of an insulative housing of the optical connector.

Referring to FIG. 8, the housing 1 includes a main portion 10 and a pair of mounting arms 12 extending backwardly from two lateral sides of the main portion 10. The main portion 10 has an upper mating port 102 formed in a top surface, a pair of positioning slots 103 extending backwardly from the upper mating port 102, and a pair of side walls 1021 surrounding around the upper mating port 102. Each of the pair of side walls 1021 defines a first guiding rail 1022 extending in an upper-to-lower direction, and a second horizontal guiding rail 1025 extending backwardly from a top end of the first guiding rail 1022. The first and the second guiding rails 1022, 1025 are communicated with the upper mating port 102 respectively and are aligned with each other in a transverse direction perpendicular to the mating direction, respectively.

Figure 6:
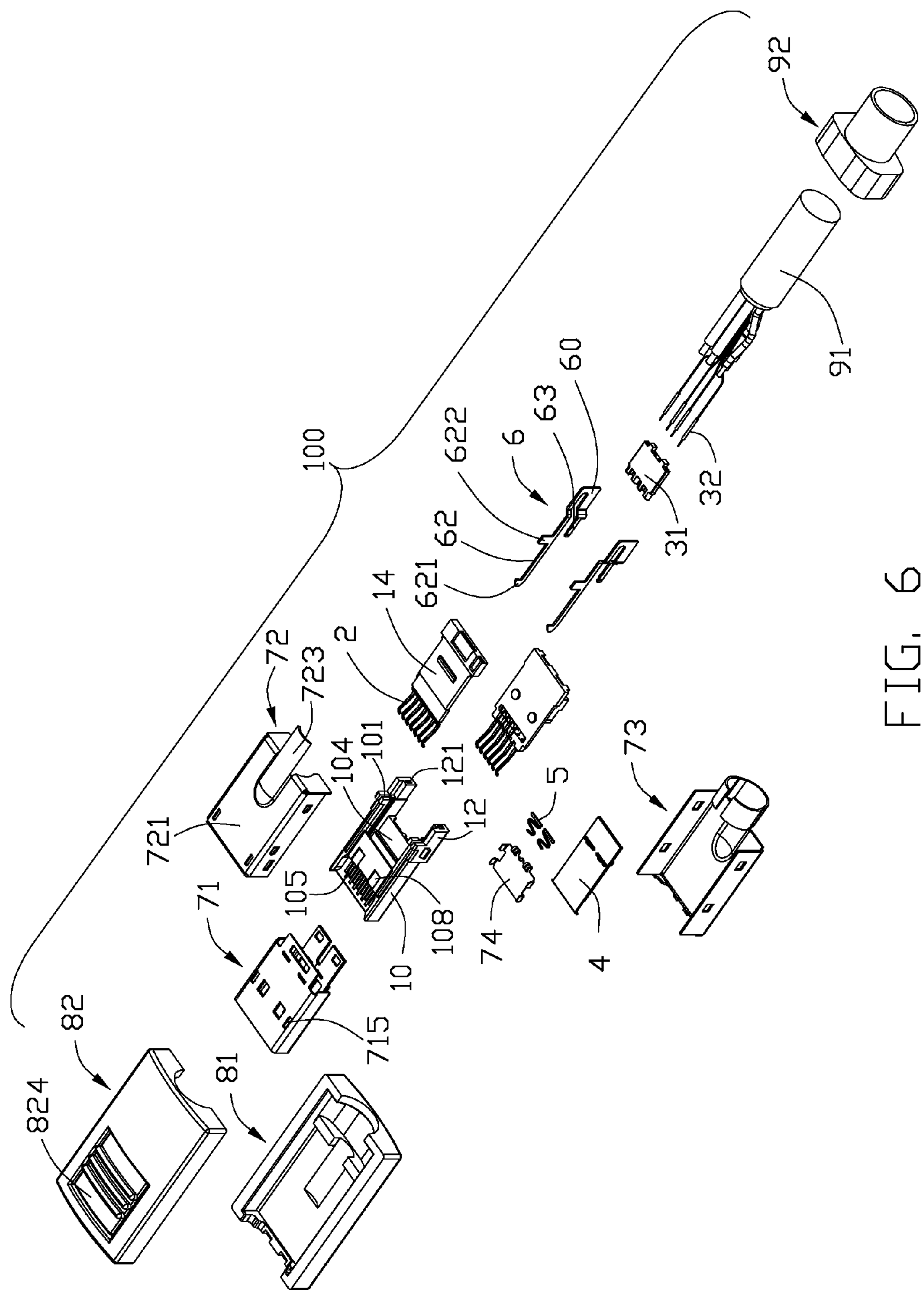
FIG. 6 is similar to FIG. 5, but viewed from another direction.

In conjunction with FIGS. 5-6, the main portion 10 has a retaining slot 104, a lower mating port 105 and a pair of recesses 108, all of which are recessed on a lower surface thereof. A mating tongue 106 is located between the upper and the lower mating ports 102, 105 in the upper-to-lower direction. The upper mating port 102 is configured with U-shaped viewed from a front side, and the lower mating port 105 is configured with reverse U-shaped viewed from the front side. The upper and the lower mating ports 102, 105 extend forwardly through the main portion 10 respectively. The main portion 10 further has a supporting block 1023 disposed in front end of the upper mating port 102. Each of the pair of mounting arms 12 has a retaining hole 121 extending forwardly from a rear end thereof and a receiving slot 101 formed on a bottom thereof. The housing 1 further includes two insulators 14 retained in the retaining slot 104 and stacked with each other in the upper-to-lower direction.

Referring to FIG. 5, the terminals 2 are insert molded in the two insulators 14 and each has a contact portion extending into the lower mating port 105 and a soldering tails connected with the cable 91. An arrangement of the terminals 2 is in accordance with Digital Interactive Interface for Video & Audio (DiiVA) standard. There are three differential pairs consisted of six signal terminals located between grounding terminals. The differential pairs for high-speed transmitting are used for conveying video signals. And a pair of signal terminals disposed aside the three differential pairs are used for audio signals.

The optical device 3 includes an optical module 31 received in the upper mating port 102, and a plurality of fibers 32 connecting the optical module 31 and the cable 91. The optical module 31 includes a number of lenses 311 aligned along the transverse direction, and a plastic seat 312 holding the lenses 311. The fibers 32 are respectively coupled to the lenses 311. In addition, the lenses 311 extend beyond a front side of the seat 312, with a gap formed between front potions of every two adjacent lenses 311. The seat 312 has a pair of positioning posts 315 protruding backwardly thereof and received in the positioning slots 103, respectively.

Figure 9:
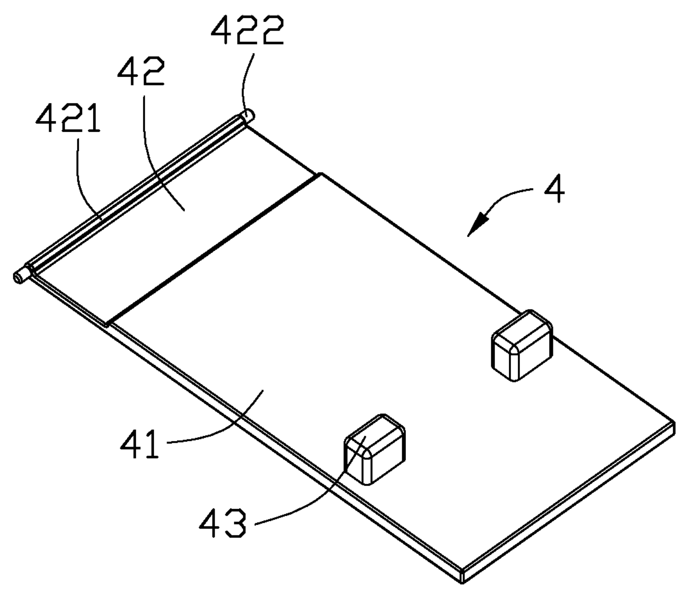
FIG. 9 is a perspective view of the dustproof mechanism of the optical connector.
Figure 10:
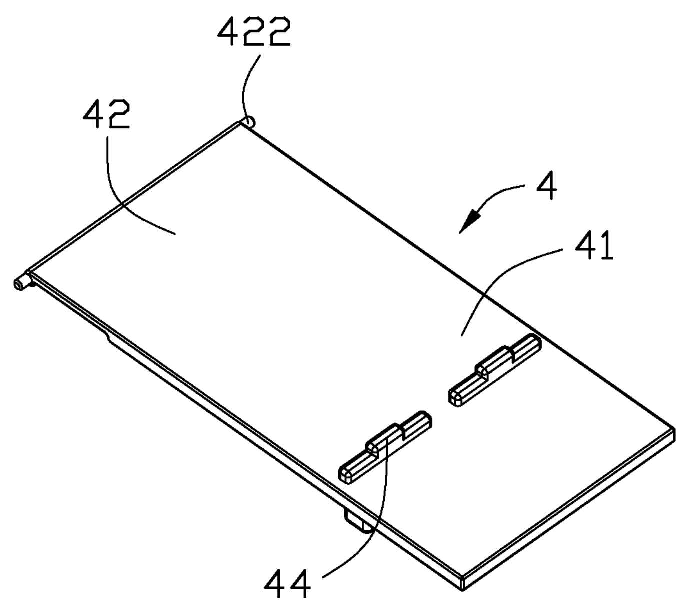
FIG. 10 is similar to FIG. 9, but viewed from another side.

Referring to FIGS. 9-10, The dustproof mechanism 4 is of one piece construction and is formed from a single die stamped metal plate. The dustproof mechanism 4 includes a planar base 41, a dustproof cover 42 extending forwardly from the base 41, a pair of pushing projections 43 protruding upwardly from the base 41, and a pair of protrusions 44 protruding downwardly from the base 41. The pair of pushing projections 43 are spaced away from each other in the transverse direction and protrude outwardly and beyond the optical connector 100 for engaging with the corresponding connector. The pair of protrusions 44 are spaced away from each other in the transverse direction too. The dustproof cover 42 is formed with a cured rib 421 disposed on a front end thereof, and a pair of sliding shafts 422 protruding outwardly from two lateral ends of the rib 421 in the transverse direction. The sliding shafts 422 are received in the first guiding trails 1022 and movable along the upper-to-lower direction and the mating direction in turn. The dustproof cover 42 has a thickness being substantially one-half of the thickness of the base 41 so as to increase flexible bending characteristics thereof. The dustproof cover 42 and the base 41 have the same width in the transverse direction.

Figure 7:
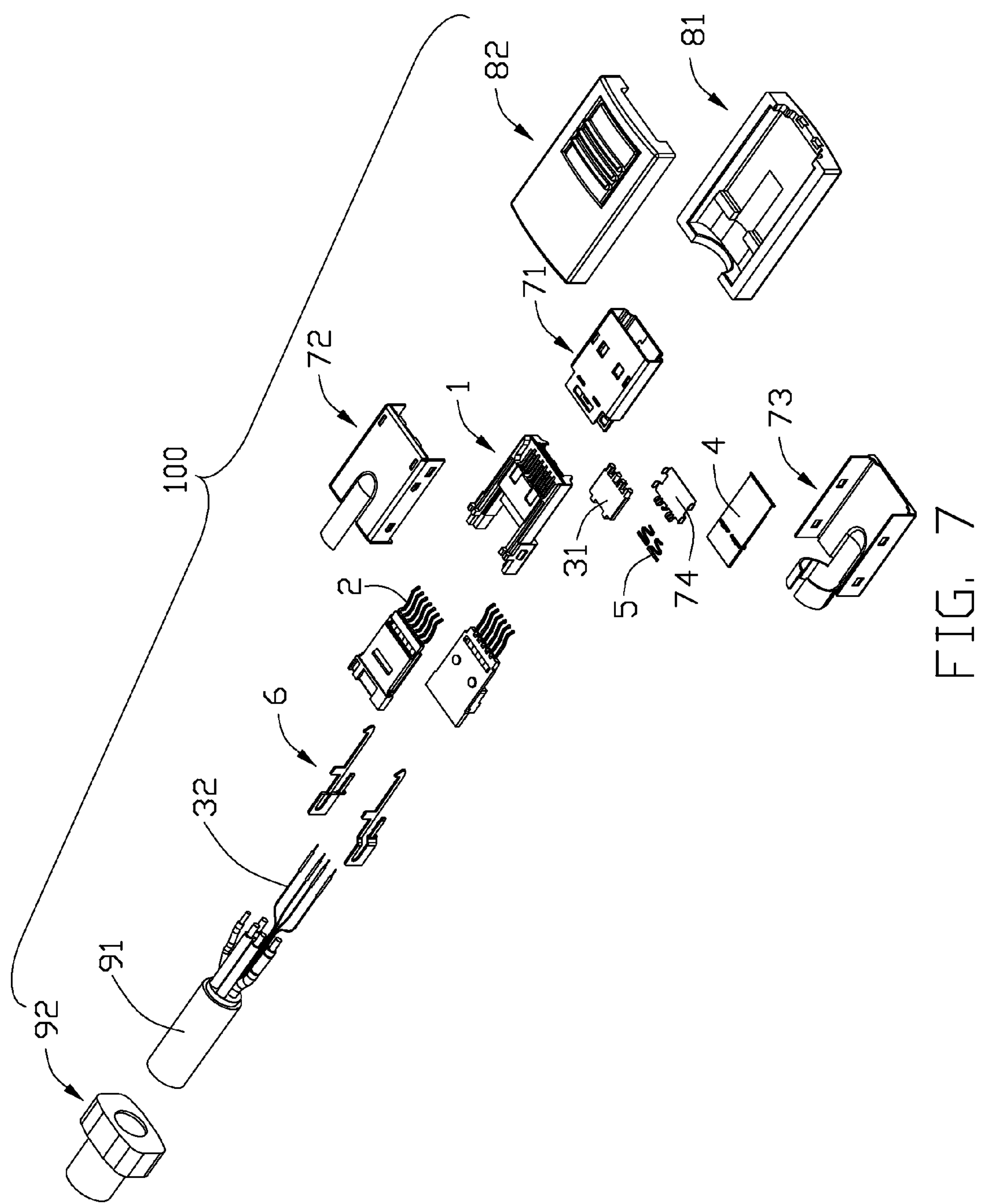
FIG. 7 is also similar to FIG. 5, but viewed from another different direction.

Referring to FIGS. 5-7, the springs 5 are received in the recesses 108 of the housing 1, respectively. Each of the pair of springs 5 presents as wave-shape viewed from a top side and has a rear end backwardly pressing against the housing 1, and a front end forwardly pressing against the protrusion 44 of the dustproof mechanism 4 to urge dustproof mechanism 4 to automatable move forwardly.

Referring to FIG. 6, each of the latching members 6 includes a connecting arm 60, a latching arm 62 and a retention arm 63. The latching arm 62 and the retention arm 63 are spaced apart from each other in the upper-to-lower direction and extend forwardly from the connecting arm 60. The latching arm 62 and the retention arm 63 are located in a first vertical plane. The connecting arm 60 is of U-shaped and located in second vertical plane which is disposed outside of the first vertical plane. The latching arm 62 has a hook 621 formed on a front end, a tab 622 formed on a bottom side thereof and disposed behind the hook 621. The hook 621 protrudes downwardly beyond the main portion 10. The tab 622 protrudes downwardly beyond the main portion 10 for locking with a corresponding connector. The retention arm 63 is inserted into the retaining hole 121 of the housing 1, and the latching arm 62 is retained in the receiving slot 101 of the housing 1.

Referring to FIGS. 5-6, the metallic shell 7 has a first shell 71, a second shell 72, a third shell 73, and a lower cap 74. The first shell 71 includes a frame 711 to directly accommodate the main portion 10 therein. The frame 711 contains a top wall, a bottom wall, and a pair of side wall connected therebetween. The top wall defines a pair of guiding slots 712 receiving the pair of pushing projections 43 respectively therein to define a moving range of the pushing projections 43 in the mating direction. Two through holes 715 are defined in a front segment of the bottom wall of the frame 711 to allow the hooks 621 of the latching arm 62 passing through. The second shell 72 includes an inverted U-shaped main portion 721 and a tail portion 723 extending backwardly. The third shell 73 includes a U-shaped main body 731 and a cable holder 733 integrated with the main body 731 and projecting backwardly. The second shell 72 and the third shell 73 are combined together in the upper-to-lower direction. The lower cap 74 is retained on the main portion 10 of the housing 1 to directly cover the optical module 31.

The external cover 8 includes an upper cover 81 and a bottom cover 82. The upper cover 81 has a front wall 811 for abutting against the corresponding connector for the optical connector 100 to be prevented from being inserted deeply into the corresponding connector. The front wall 811 defines a pair of rectangular shaped opening 812 passing therethrough in the mating direction. The openings 812 are disposed above the guiding slots 712 and communicate with the guiding slots 712 respectively. The guiding slots 712 extend forwardly and beyond the openings 812. The lower cover 82 is integrally formed with a deformable button 824 floatable along the upper-to-lower direction so as to actuate the tab 622 of the latching arm 62. When detach the optical connector 100 from the corresponding connector, just press the deformable button 824 to actuate the tab 624 of the latching arm 62, and the latching arm 62 retreat into the receiving slots 101. When the pressing force is withdrawn, the deformable button 824 is restored to its original position, and the latching arms 62 also upwardly move by rebounded force.

The strain relief member 92 is molded over a front segment of the cable 91 and accommodated in the external cover 8.

Figure 3:
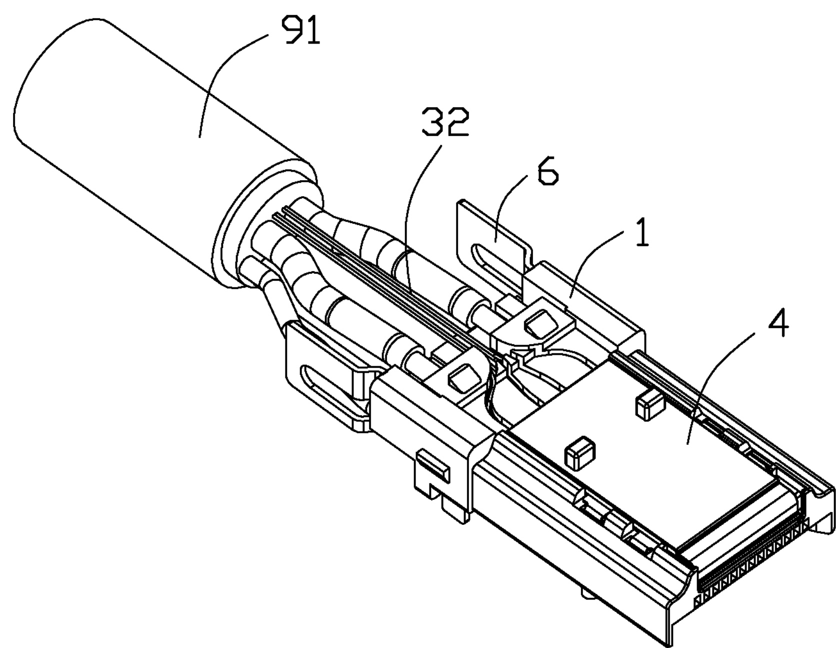
FIG. 3 is a partially assembling, perspective view of the optical connector without a metallic shell, an external cover and a strain relief, showing an optical module covered by the dustproof mechanism.
Figure 4:
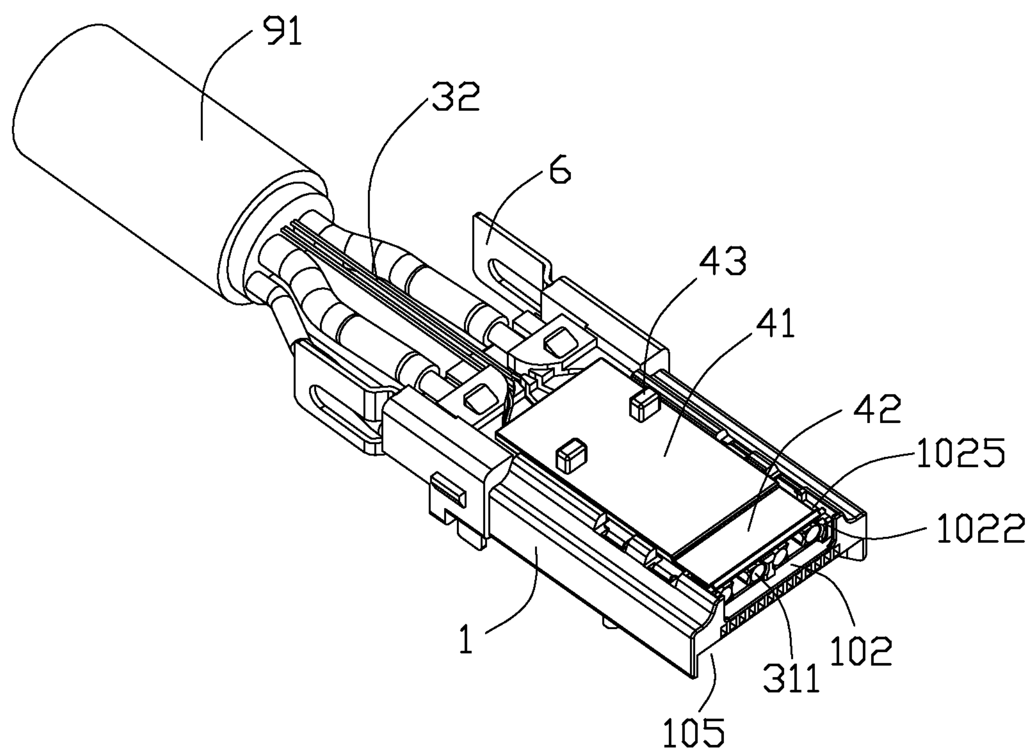
FIG. 4 is similar to FIG. 3, but showing the optical module exposed to an exterior of the optical connector.

Referring to FIGS. 3-4, when the optical connector 100 does not mate with the corresponding connector, the dustproof mechanism 4 is positioned at an initial position, the dustproof cover 42 is perpendicular to the base 41 and is positioned in the upper mating port 102 to cover a front end of the optical module 31 for preventing dust from falling on the lenses 311 of the optical module 31. When the optical connector 100 need to mate with the corresponding connector, the dustproof mechanism 4 is pushed backwardly by the pushing projections 43 being pushed and then arrives a final position, configured as a horizontal plate, the dustproof cover 42 leaves from outwardly from the upper mating port 102 to be positioned above the optical module 3 and allow the optical module 31 to mate with the corresponding connector.

When the optical connector 100 is being inserted into the corresponding connector, the dustproof mechanism 4 moves between the initial position and the final position along the mating direction. The corresponding connector abuts against the pushing projections 43 to urge the pushing projections 43 to backwardly move in the guiding slots 712, and the sliding shafts 422 moves upwardly in the first guiding rails 1022 and is divided into two parts being perpendicular to each other, one part is positioned above the optical module 31 and disposed in a horizontal plane, the other part is still received in the upper mating port 102 and positioned in a vertical plane. When the optical connector 100 is fully inserted into the corresponding connector, the pushing projections 43 is wholly accommodated in the openings 821 of the external cover 8, and the whole dustproof mechanism 4 is disposed in the horizontal plane and arrives the final position. After the optical connector 100 is withdraw from the corresponding connector, the dustproof mechanism 4 moves to the initial position via the pair of springs 5. The pushing projections 43 is disposed at outside of the optical connector 100 and are adapted for directly abutting against the corresponding connector for achieving a mate between the optical connector 100 and the corresponding connector conveniently for user.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. An optical connector adapted for mating with a corresponding connector, comprising:

an insulative housing defining an upper mating port;

an optical device received in the housing and having at least one lens exposed to the upper mating port; and a dustproof mechanism movably retained in the housing along a mating direction of the optical connector, the dustproof mechanism including a dustproof cover disposed in the mating port in an initial position and covering the lens along the mating direction, and a pushing projection protruding to an exterior of the optical connector;

wherein when optical connector mates with the corresponding connector, the pushing projection is pushed backwardly to urge the dustproof cover to leave from the upper mating port and allow the lens to optically couple to the corresponding connector.

2. The optical connector as recited in claim 1, further comprising a metallic shell defining a frame accommodating the insulative housing therein, and an external cover enclosing the shell, a top wall of the frame has a guiding slot receiving the pushing projection therein to define a moving range of the pushing projection in the mating direction, the external cover defines an opening disposed behind the guiding slot to receive the pushing projection while the dustproof mechanism moves at a final position.

3. The optical connector as recited in claim 1, wherein the dustproof cover is configured as flexible bending structure so as to be able to gradually bend from a vertical plane to a horizontal plane while the dustproof mechanism moves backwardly in the mating portion.

4. The optical connector as recited in claim 1, wherein the dustproof mechanism includes a planar base extending backwardly from the dustproof cover and formed with the pushing projection, when the optical connector mates with the corresponding connector, the dustproof is divided into two parts perpendicular to each other in condition that one part still covers the lens while the other part is located above the optical module and positioned in a horizontal plane.

5. The optical connector as recited in claim 4, wherein the dustproof cover has a thickness being substantially one-half of the thickness of the base.

6. The optical connector as recited in claim 1, wherein the housing includes a pair of side walls surrounding around the upper mating port to receive the dustproof cover therebetween, the pair of side walls define a pair of guiding rails in an upper-to-lower direction, and a pair of second guiding rails extending backwardly from top ends of the first guiding trails, the dustproof cover has a pair of sliding shafts being movable in the first and the second guiding rails in turn.

7. The optical connector as recited in claim 4, further comprising a spring sandwiched between the dustproof mechanism and the housing in the mating direction and forwardly pressing against the dustproof mechanism for urging the dustproof cover to return to an initial position while the optical connector disengages from the corresponding connector.

8. The optical connector as recited in claim 7, wherein the housing defines a recess accommodating the spring therein, the base has a protrusion extending downwardly therefrom and located behind the dustproof cover, the spring abuts against the protrusion in the mating direction.

9. The optical connector as recited in claim 1, wherein the dustproof mechanism is of one piece construction and is formed from a single die stamped metal plate.

10. The optical connector as recited in claim 1, further comprising a cable connected with the optical device, and a plurality of terminals retained in the housing and connected with the cable, an arrangement of the terminals is in accordance with DiiVA standard, the housing defines a lower mating port accommodating the terminals therein, and a mating tongue between the upper mating port and the lower mating port in the upper-to-lower direction.

11. A cable connector assembly, comprising:

an insulative housing having an upper mating port and a lower mating port respectively located in an upper side and a lower side of a front segment thereof;

an optical module accommodated in the upper mating port, the optical module having a seat and at least one lens mounted into the seat;

a plurality of terminals assembled in the housing and extending into the lower mating port;

a dustproof mechanism attached to the housing and being movable between an initial position and a final position; and a cable connected to the lens and the terminals;

wherein the dustproof mechanism covers the lens at the initial position for dustproof shield, at least one of the lens and the terminals are exposed to an exterior of the cable connector assembly for engaging with a corresponding connector while the dustproof mechanism is at the final position.

12. The cable connector assembly as recited in claim 11, wherein the dustproof mechanism includes a planar base disposed above the optical module, a dustproof cover bent downwardly from a front end of the base and located at a vertical plane to cover the upper mating port, the dustproof cover is configured as flexible bending structure which is able to gradually bend from the vertical plane to a horizontal plane while the base moves in a mating portion of the cable connector assembly.

13. The cable connector assembly as recited in claim 12, wherein the dustproof cover is one piece construction formed from a single die stamped metal plate, the dustproof cover has a thickness being smaller than that of the base, the cable connector assembly includes a spring forwardly pressing against the dustproof mechanism to urge the dustproof mechanism to move to the initial position after the cable connector assembly is withdraw from the corresponding connector.

14. The cable connector assembly as recited in claim 12, wherein the base has a pushing projection protruding to an outside of the cable connector assembly, the cable connector assembly further comprises a metallic shell having a frame accommodating the insulative housing therein, the frame has a top wall defining a guiding slot receiving the pushing projection therein to define a moving range of the pushing projection in the mating direction.

15. The cable connector assembly as recited in claim 12, wherein the housing includes a pair of side wall located at two lateral sides of the upper mating port and defines a first pair of guiding rails extending in an upper-to-lower direction and a second pair of guiding rails extending backwardly from top sides of the first guiding rails, the dustproof cover has a pair of sliding shafts being movable in the first and the second guiding rails in turn while the dustproof mechanism moves between the initial position and the final position.

16. A connector assembly for use with a complementary connector having optical transmission thereof, comprising:

an insulative housing defining a mating port forwardly communicating with an exterior in a front-to-back direction via an opening in a front face of the housing, said housing defining an optical region;

an optical module disposed in the optical region with lens means around the front face; and a dustproof cover moveably shielding the lens means from the exterior in said front-to-back direction.

17. The connector assembly as claimed in claim 16, wherein the dustproof cover is flexible in a vertical direction perpendicular to said front-to-back direction, and moveable in the front-to-back direction.

18. The connector assembly as claimed in claim 16, wherein the dustproof cover is equipped with a pushing projection exposed outside of the mating port for confrontation with the complementary connector for rearward movement of the dustproof cover.

19. The connector assembly as claimed in claim 16, further including a metallic shell enclosing the housing around the mating port, wherein the pushing projection extends out of the shell.

20. The connector assembly as claimed in claim 16, further including a cable set including optical fibers connected to the corresponding lens means.

* * * * *